(12) United States Patent
Yamagishi et al.

(10) Patent No.: US 9,505,918 B2
(45) Date of Patent: Nov. 29, 2016

(54) CHLOROPRENE RUBBER COMPOSITION, AND VULCANIZATE AND MOLDING THEREOF

(75) Inventors: Uichiro Yamagishi, Itoigawa (JP); Yasushi Abe, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 13/988,931

(22) PCT Filed: Jun. 21, 2011

(86) PCT No.: PCT/JP2011/064120
§ 371 (c)(1),
(2), (4) Date: May 22, 2013

(87) PCT Pub. No.: WO2012/070270
PCT Pub. Date: May 31, 2012

(65) Prior Publication Data
US 2013/0253138 A1    Sep. 26, 2013

(30) Foreign Application Priority Data

Nov. 26, 2010    (JP) .................................. 2010-263795

(51) Int. Cl.
*C08L 53/02* (2006.01)
*C08L 11/00* (2006.01)
*C08L 7/00* (2006.01)
*C08L 15/02* (2006.01)
(Continued)

(52) U.S. Cl.
CPC .................. *C08L 11/00* (2013.01); *C08L 7/00* (2013.01); *C08L 15/02* (2013.01); *C08K 5/40* (2013.01); *C08K 5/405* (2013.01); *C08L 53/02* (2013.01)

(58) Field of Classification Search
CPC .......... C08L 11/00; C08L 11/02; C08L 7/00; C08L 7/02; C08L 53/02; C08K 5/40; C08K 5/405
See application file for complete search history.

(56) References Cited

U.S. PATENT DOCUMENTS 3,988,506 A * 10/1976 Dohi et al. ................. 526/219.5
2002/0039633 A1* 4/2002 Kawashima ................. 428/40.1
2002/0049294 A1* 4/2002 Shiina ......................... 526/329.2
(Continued)

FOREIGN PATENT DOCUMENTS

CN    101353453 A    1/2009
CN    101353453 B  * 10/2012
(Continued)

OTHER PUBLICATIONS

Mingyi et al. He Cheng Ziang Jiao Gong Ye 1997.*
(Continued)

*Primary Examiner* — Mark Kaucher
(74) *Attorney, Agent, or Firm* — Stein IP, LLC

(57) ABSTRACT

To provide a chloroprene rubber composition providing good permanent compression set and excellent mechanical strength, a vulcanizate of the composition, and a molded article of the composition. A chloroprene rubber composition including a chloroprene rubber and a natural rubber in a total amount of 100 parts by mass, a copolymer of styrene and butadiene in an amount of 0.1 to 10 parts by mass, ethylene thiourea in an amount of 0.1 to 3.0 parts by mass, and dipentamethylenethiuram tetrasulfide in an amount of 0.1 to 3.0 parts by mass is vulcanized after or during molding of the composition to yield a vulcanized molding.

11 Claims, 1 Drawing Sheet

(51) Int. Cl.
  *C08K 5/40*    (2006.01)
  *C08K 5/405*   (2006.01)

(56) References Cited

U.S. PATENT DOCUMENTS

| | | |
|---|---|---|
| 2002/0162627 A1 | 11/2002 | Dunlap |
| 2004/0253459 A1 | 12/2004 | Triebes et al. |
| 2005/0064212 A1 | 3/2005 | Dunlap |
| 2005/0271842 A1 | 12/2005 | Triebes et al. |

FOREIGN PATENT DOCUMENTS

| | | | |
|---|---|---|---|
| JP | 6-279621 | 10/1994 | |
| JP | 7-145269 | 6/1995 | |
| JP | 8-319375 | 12/1996 | |
| JP | 08319375 A * | 12/1996 | ............... C08L 7/00 |
| JP | 10-101850 | 4/1998 | |
| JP | 11-153169 | 6/1999 | |
| JP | 2001-49048 | 2/2001 | |
| JP | 2004-532907 | 10/2004 | |
| JP | 2007-511620 | 5/2007 | |
| JP | 2008-195870 | 8/2008 | |
| JP | 2008195870 A * | 8/2008 | |
| WO | WO 02/068508 | 9/2002 | |
| WO | WO 2004/111129 | 12/2004 | |

OTHER PUBLICATIONS

Machine Translation of JP 2008-195870 (2014).*
Scifinder site for Compatibilization effect of styrenic thermoplastic elastomer on IR/CR (2014).*
Tyutnev et al. Acta Polymerica 37 (1986) Nr. 6.*
Machine Translation of JP 08319375 A (2014).*
English translation of Mingyi et al. He Cheng Ziang Jiao Gong Ye 1997.*
International Search Report for PCT/JP2011/064120; filed Sep. 13, 2011.
Chinese Office Action issued by SIPO on May 20, 2014 to Chinese Application No. 201180056119.5.
Compatibilization Effectof Styrenic Thermoplatic Eleastomer on IR/CR, May 24, 1995, pp. 162-165.
$2^{nd}$ Chinese Notice of Reasons for Rejection for Application No. 201180056119.5 dated Feb. 9, 2015 and Japanese translation.

* cited by examiner (a)

(b)

CHLOROPRENE RUBBER COMPOSITION, AND VULCANIZATE AND MOLDING THEREOF

CROSS-REFERENCE TO RELATED APPLICATIONS

This application is a national stage application of PCT Application No. PCT/JP2011/064120, filed Jun. 21, 2011, which claims the benefit of Japanese Application No. JP-2010-263795, filed Nov. 26, 2010, in the Japanese Intellectual Property Office, the disclosures of which are incorporated herein by reference.

BACKGROUND OF THE INVENTION

1. Field of the Invention

The present invention relates to a chloroprene rubber composition, a vulcanizate thereof, and a molding using them. More specifically, the present invention relates to a chloroprene rubber composition used for rubber molding such as a wiper blade and a vibration isolator.

2. Description of the Related Art

Chloroprene rubber is excellent in heat resistance, weather resistance, ozone resistance, chemical resistance, and other properties and has been used in wide variety of fields such as general industrial rubber products, automobile parts, and adhesives. Such a chloroprene rubber molded piece is typically produced by molding a chloroprene rubber composition including a chloroprene rubber in combination with a vulcanizing agent, a vulcanization accelerator, a filler, and other components into a predetermined shape and then vulcanization.

Examples of the vulcanization accelerator used for such a production process include a thiourea vulcanization accelerator, a thiazole vulcanization accelerator, a thiuram vulcanization accelerator, and a guanidine vulcanization accelerator (for example, see Patent Document 1). For example, in a chloroprene rubber composition described in Patent Document 1, combination use of a thiourea vulcanization accelerator and a thiuram vulcanization accelerator intends to improve both scorch stability and permanent compression set characteristics.

A high damping rubber composition has been developed (see Patent Document 2). The composition includes a natural rubber and a chloroprene rubber, and the natural rubber alone is vulcanized, thus improving damping characteristics. In addition, a technique has also been developed in order to improve the heat resistance and the permanent compression set of a vulcanizate (see Patent Document 3). In the technique, a non-sulfur-modified chloroprene rubber is vulcanized using an organic peroxide and a co-cross-linking agent.

CITATION LIST

[Patent Document 1] Japanese Unexamined Patent Application Publication No. 6-279621
[Patent Document 2] Japanese Unexamined Patent Application Publication No. 11-153169
[Patent Document 3] Japanese Unexamined Patent Application Publication No. 7-145269

SUMMARY OF THE INVENTION

Unfortunately, the conventional chloroprene rubber compositions described above have a problem of being inferior in permanent compression set either at low temperature or at high temperature. On this account, there is a demand for a chloroprene composition providing good permanent compression set within a wide region from a low temperature to a high temperature and providing excellent mechanical strength.

To address this, the present invention has an object to provide a chloroprene rubber composition providing good permanent compression set and excellent mechanical strength, and a vulcanizate and a molding thereof.

A chloroprene rubber composition of the present invention includes a chloroprene rubber and a natural rubber in a total amount of 100 parts by mass, a copolymer of styrene and butadiene in an amount of 0.1 to 10 parts by mass, ethylene thiourea in an amount of 0.1 to 3.0 parts by mass, and dipentamethylenethiuram tetrasulfide in an amount of 0.1 to 3.0 parts by mass.

In the present invention, the chloroprene rubber composition, which includes the copolymer of styrene and butadiene serving as a compatibilizer in a particular amount, allows the chloroprene and the natural rubber to be co-vulcanized while finely dispersing the natural rubber in the chloroprene. This enables the improvement of the permanent compression set at a low temperature or at a high temperature without reducing the mechanical strength.

In the composition, the block copolymer of styrene and butadiene may be a copolymer including styrene and butadiene in a mass ratio (styrene/butadiene) of 25/75 to 45/55.

The chloroprene rubber may be a chloroprene rubber including a 2,3-dichlorobutadiene unit in an amount of 5 to 20% by mass.

The blending ratio of the chloroprene rubber and the natural rubber (chloroprene rubber/natural rubber) may be, for example, 60/40 to 95/5 by mass ratio.

A vulcanizate of the present invention is obtained by vulcanization of the chloroprene rubber composition.

In the present invention, the vulcanizate, which uses the chloroprene rubber composition including the copolymer of styrene and butadiene in a particular amount and is obtained by co-vulcanization of the chloroprene rubber and the natural rubber, is excellent in permanent compression set at high temperature and heat resistance.

A molding of the present invention is obtained by vulcanization of the chloroprene rubber composition described above after or during molding of the composition.

The molding is, for example, a wiper blade or a vibration isolator.

The present invention uses a blend rubber that includes a chloroprene rubber and a natural rubber and to which a copolymer of styrene and butadiene is added in a particular amount and thus can afford a vulcanized molding having good permanent compression set within a wide region from a low temperature to a high temperature and also having excellent mechanical strength.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
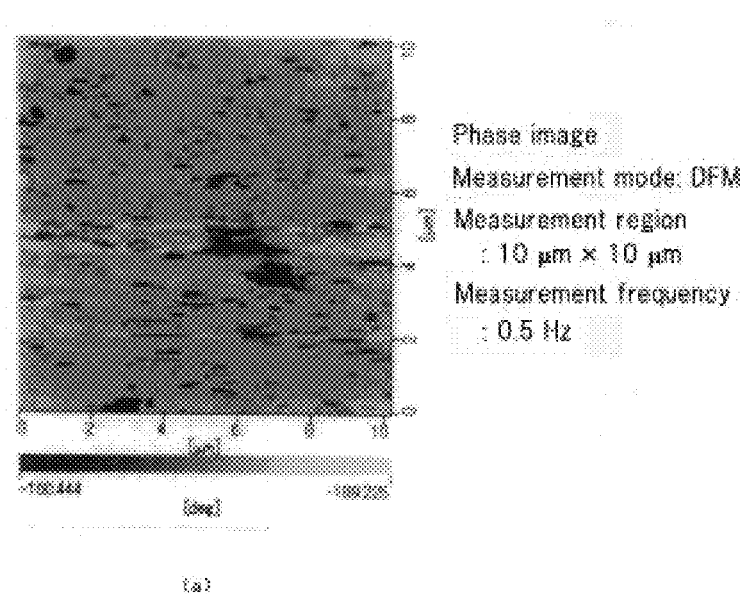
FIG. 1(a) shows an SPM measurement result of a chloroprene rubber composition of Example 2 and FIG. 1(b)
Figure 1:
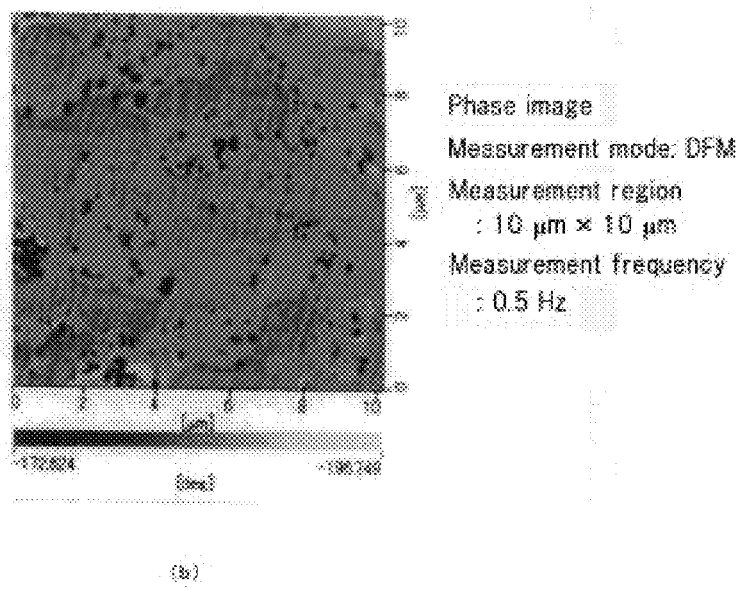

shows an SPM measurement result of a chloroprene rubber composition of Comparative Example 8.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments for carrying out the present invention will now be described in detail. However, the present invention is not intended to be limited to the embodiments described below.

First Embodiment

First, a chloroprene rubber composition of a first embodiment of the present invention will be described. The chloroprene rubber composition of the embodiment is a blend rubber composition including a chloroprene rubber and a natural rubber as rubber components. The composition further includes a copolymer of styrene and butadiene in an amount of 0.1 to 10 parts by mass, ethylene thiourea in an amount of 0.1 to 3.0 parts by mass, and dipentamethylenethiuram tetrasulfide in an amount of 0.1 to 3.0 parts by mass, with respect to 100 parts by mass of these rubber components (chloroprene rubber and natural rubber).

[Rubber Component]

The chloroprene rubber included in the chloroprene rubber composition of the embodiment is not particularly limited and the chloroprene rubber used is preferably a copolymer of a chloroprene rubber (2-chloro-1,3-butadiene) and 2,3-dichlorobutadiene. In such a case, the chloroprene more preferably includes a 2,3-dichlorobutadiene unit in an amount of 5 to 20% by mass.

The amount of the 2,3-dichlorobutadiene unit in the chloroprene rubber affects anti-crystallization properties and brittleness temperature of a vulcanizate or a molding obtained by vulcanization of the chloroprene rubber composition. Using the chloroprene including the 2,3-dichlorobutadiene unit in an amount of 5 to 20% by mass can improve not only heat resistance but also low temperature characteristics, thereby affording a vulcanizate and a vulcanized molding excellent in characteristics within a wide region from a low temperature to a high temperature.

The chloroprene rubber composition used in the chloroprene rubber of the embodiment may be a copolymer including other monomers in addition to 2,3-dichlorobutadiene described above. Examples of the monomer copolymerizable with chloroprene include acrylic acid esters such as methyl acrylate, butyl acrylate, and 2-ethylhexyl acrylate; methacrylic acid esters such as methyl methacrylate, butyl methacrylate, and 2-ethylhexyl methacrylate; hydroxy (meth)acrylates such as 2-hydroxyethyl(meth)acrylate, 2-hydroxymethyl(meth)acrylate, and 2-hydroxypropyl (meth)acrylate; and 2,3-dichloro-1,3-butadiene, 1-chloro-1, 3-butadiene, butadiene, isoprene, ethylene, styrene, and acrylonitrile.

The natural rubber included in the chloroprene rubber composition of the embodiment is not particularly limited and known natural rubbers can be used. Blending a natural rubber to a chloroprene rubber as above can improve low temperature characteristics, especially improve permanent compression set at low temperature.

At that time, the blending ratio of the chloroprene rubber and the natural rubber (chloroprene rubber/natural rubber) is desirably 60/40 to 95/5 by mass ratio. This can improve the heat resistance and the permanent compression set at high temperature in addition to the low temperature characteristics.

[Copolymer of Styrene and Butadiene: 0.1 to 10 Parts by Mass]

The copolymer of styrene and butadiene is a compatibilizer and affects the interface of a sea-island structure formed of the chloroprene rubber and the natural rubber as the rubber components thereby to finely disperse the natural rubber with respect to the chloroprene rubber as a matrix. However, a copolymer of styrene and butadiene included in an amount of less than 0.1 part by mass based on 100 parts by mass of the rubber component is short with respect to the interface between the chloroprene rubber and the natural rubber thus to provide insufficient dispersion effect. This reduces the permanent compression set and the mechanical strength. This is supposed to be because the reduction in the interface between the chloroprene rubber and, the natural rubber interferes with good co-vulcanization.

A copolymer of styrene and butadiene included in an amount of more than 10 parts by mass based on 100 parts by mass of the rubber component is excess with respect to the interface between the chloroprene rubber and the natural rubber. This reduces the low temperature characteristics and the mechanical strength. This is supposed to be because such a copolymer of styrene and butadiene forms an island structure in a matrix composed of the chloroprene rubber independently of the natural rubber. Thus, the amount of the copolymer of styrene and butadiene is 0.1 to 10 parts by mass based on 100 parts by mass of the rubber component. This can improve both the permanent compression set and the mechanical characteristics.

The "copolymer of styrene and butadiene" included in the chloroprene rubber composition of the embodiment preferably has a mass ratio of styrene and butadiene (styrene/butadiene) of 25/75 to 45/55. A mass ratio of styrene and butadiene out of the range may deteriorate the effect as the compatibilizer for the chloroprene rubber and the natural rubber. In the copolymer of styrene and butadiene, the mass ratio of styrene and butadiene preferably ranges from 30/70 to 40/60. A copolymer having such a ratio can further increase the effect of finely dispersing the natural rubber with respect to the chloroprene rubber as a matrix side.

Examples of the type of the "copolymer of styrene and butadiene" included in the chloroprene rubber composition of the embodiment include, but are not necessarily limited to, a cross copolymer of them, a block copolymer of them, and a block-random polymer of them. Among these copolymers, a styrene-butadiene-styrene triblock copolymer is especially preferred.

[Ethylene Thiourea: 0.1 to 3.0 Parts by Mass]

Ethylene thiourea is a vulcanization accelerator and has an effect of increasing the vulcanization density of a chloroprene rubber to improve mechanical strength. However, ethylene thiourea included in an amount of less than 0.1 part by mass based on 100 parts by mass of the rubber component can fail to achieve sufficient cross-linking density thereby to deteriorate the permanent compression set or the mechanical strength.

Ethylene thiourea included in an amount of more than 3.0 parts by mass based on 100 parts by mass of the rubber component accelerates vulcanization speed to deteriorate processing characteristics during molding. Here, the processing characteristics is also called "processing safety" and is evaluated by scorch time. The processing characteristics greatly affect the incidence of defective. For example, a short scorch time leads to vulcanization of unvulcanized components during molding at high temperature and this increases the frequency of occurrence of molding defective. Thus, the amount of ethylene thiourea is 0.1 to 3.0 parts by mass based on 100 parts by mass of the rubber component.

[Dipentamethylenethiuram Tetrasulfide: 0.1 to 3.0 Parts by Mass]

Dipentamethylenethiuram tetrasulfide is also a vulcanization accelerator and has effects of co-vulcanizing chloroprene and a natural rubber thus to increase mechanical strength and to improve permanent compression set at low temperature. However, dipentamethylenethiuram tetrasulfide included in an amount of less than 0.1 part by mass based on 100 parts by mass of the rubber component can fail to achieve sufficient cross-linking density thereby to deteriorate the permanent compression set or the mechanical strength. Dipentamethylenethiuram tetrasulfide included in an amount of more than 3.0 parts by mass accelerates vulcanization speed to fail to ensure sufficient processing characteristics. Thus, the amount of dipentamethylenethiuram tetrasulfide is 0.1 to 3.0 parts by mass based on 100 parts by mass of the rubber component.

The chloroprene rubber composition of the embodiment includes a chloroprene rubber in combination with a natural rubber, thereby improving the low temperature characteristics. In addition, the chloroprene rubber composition includes the copolymer of styrene and butadiene in an amount of 0.1 to 10 parts by mass based on 100 parts by mass of these rubber components (chloroprene rubber, natural rubber), thereby enabling fine dispersion of the natural rubber into the chloroprene rubber.

The chloroprene rubber composition further includes ethylene thiourea and dipentamethylenethiuram tetrasulfide in combination as vulcanization accelerators in respective amounts of 0.1 to 3.0 parts by mass with respect to 100 parts by mass of the rubber components. This allows the chloroprene rubber and the natural rubber to be co-vulcanized while maintaining a dispersion state. The use of such vulcanization accelerators also improves processing characteristics.

As a result, the chloroprene rubber composition of the embodiment can achieve good permanent compression set in a wide region from a low temperature to a high temperature and excellent mechanical strength and processing characteristics. The composition described in Patent Document 2 above also includes a natural rubber. Unfortunately, the constitution of the composition can fail to finely disperse the natural rubber into a chloroprene matrix. Thus, the composition provides inferior permanent compression set and mechanical strength to those by the chloroprene rubber composition of the embodiment.

Second Embodiment

Next, a vulcanizate of a second embodiment of the present invention will be described. The vulcanizate of the embodiment is obtained by adding a vulcanizing agent to the chloroprene rubber composition of the first embodiment described above, then kneading the mixture at a vulcanization temperature or below, and vulcanization. The vulcanization temperature during the vulcanization can be appropriately set depending on the composition of a chloroprene rubber composition and the type of a vulcanizing agent. The vulcanization temperature is commonly preferably in a range of 140 to 190° C. and more preferably in a range of 150 to 180° C.

Examples of the vulcanizing agent capable of being added to the chloroprene rubber composition of the embodiment include elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium and oxides and hydroxides of them. Among these metal compounds, calcium oxide, zinc oxide, antimony dioxide, antimony trioxide, and magnesium oxide are especially preferred because such a compound has high vulcanization effect. These vulcanizing agents may be used in combination of two or more of them.

The vulcanizate of the embodiment may include, as necessary, a softener, a filler, a reinforcement, a plasticizer, a process aid, a lubricant, an antioxidant agent, a stabilizer, a silane coupling agent, and other additives.

The filler and the reinforcement included in the vulcanizate of the embodiment may be a filler and a reinforcement commonly used for chloroprene rubbers and examples include carbon black, silica, clay, talc, and calcium carbonate.

The plasticizer may also be a plasticizer commonly used for chloroprene rubbers and examples include dioctyl phthalate and dioctyl adipate.

The antioxidant agent may be an antioxidant agent commonly used for chloroprene rubbers. Usable examples specifically include an amine antioxidant agent, an imidazole antioxidant agent, a metal carbamate, a phenol antioxidant agent, and wax. These antioxidant agents may be used singly or in combination. In particular, among these antioxidant agents, using, for example, 4,4'-bis($\alpha,\alpha$-dimethylbenzyl) diphenylamine and octylated diphenylamine enables a polychloroprene elastomer composition to have improved heat resistance.

The softener may be a softener commonly used for chloroprene rubbers. Usable examples specifically include petroleum softeners such as lubricant, process oil, paraffin, liquid paraffin, vaseline, and petroleum asphalt; and vegetable oil softeners such as rapeseed oil, linseed oil, castor oil, and coconut oil. These softeners may be used singly or in combination of them.

The vulcanizate of the embodiment uses the chloroprene rubber composition of the first embodiment described above and thus has good permanent compression set within a wide region from a low temperature to a high temperature and excellent mechanical strength.

Third Embodiment

A molding of a third embodiment of the present invention will be described next. The molding of the embodiment is obtained by vulcanization of the chloroprene rubber composition of the first embodiment described above after or concurrently with molding of the composition. The molding method is not particularly limited and press molding, injection molding, extrusion molding, and other molding can be employed. For example, for a molding to be used as a wiper blade or a vibration isolator such as a rubber vibration isolator for automobiles and an industrial rubber vibration isolator, press molding or injection molding can be employed for the molding.

The molding of the embodiment uses the chloroprene rubber composition of the first embodiment described above. This allows the chloroprene rubber and the natural rubber to be co-vulcanized without deteriorating heat resistance. Thus, the molding has good permanent compression set at both a low temperature and a high temperature and has excellent mechanical strength.

Advantageous effects of the present invention will be specifically described with reference to examples and comparative examples of the present invention hereinbelow. In the examples, "Tufprene A (registered trademark)" manufactured by Asahi Kasei Corporation was used as a compatibilizer (copolymer of styrene and butadiene), chloroprene rubber compositions of Examples 1 to 4 and Comparative Examples 1 to 7 were prepared in accordance with the formulations shown in Table 1 and Table 2, and the characteristics of the compositions were evaluated.

(Tensile Strength)

A test piece was prepared in accordance with JIS K 6250 (vulcanization condition: 160° C. for 10 minutes), and the test piece was subjected to tensile test in accordance with JIS K 6253, thereby determining the strength and the elongation of each vulcanizate (vulcanized rubber).

(Permanent Compression Set)

Each chloroprene rubber composition of Examples and Comparative Examples was vulcanized at 160° C. for 15 minutes, and the vulcanizate was subjected to the test in accordance with JIS K 6262 in a temperature condition of 120° C. for 70 hours, thereby determining the permanent compression set.

(Low Temperature Permanent Compression Set)

TABLE 1

| | | Example 1 | Example 2 | Example 3 | Example 4 |
|---|---|---|---|---|---|
| Rubber component (100 parts by mass in total) | Chloroprene (% by mass) | 60 | 60 | 60 | 60 |
| | Natural rubber (% by mass) | 40 | 40 | 40 | 40 |
| Compatibilizer | SBS (part by mass) | 0.1 | 5 | 10 | 5 |
| Vulcanization accelerator | Ethylene thiourea (part by mass) | 0.6 | 0.6 | 0.6 | 0.6 |
| | Dipentamethylenethiuram tetrasulfide (part by mass) | 2 | 2 | 2 | 2 |
| Vulcanizing agent | MgO (part by mass) | 2.4 | 2.4 | 2.4 | 2.4 |
| | ZnO (part by mass) | 5 | 5 | 5 | 5 |
| | Sulfur (part by mass) | 1 | 1 | 1 | 0 |
| Process aid | Stearic acid (part by mass) | 0.5 | 0.5 | 0.5 | 0.5 |
| Antioxidant agent | N-phenyl-1-naphthylamine (part by mass) | 2 | 2 | 2 | 2 |
| | 4,4'-Bis(α,α-dimethylbenzyl)diphenylamine (part by mass) | 5 | 5 | 5 | 5 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Rubber component (100 parts by mass in total) | Chloroprene (% by mass) | 60 | 60 | 60 | 60 | 60 | 60 | 60 |
| | Natural rubber (% by mass) | 40 | 40 | 40 | 40 | 40 | 40 | 40 |
| Compatibilizer | SBS (part by mass) | 0.01 | 20 | 5 | 5 | 5 | 5 | 5 |
| Vulcanization accelerator | Ethylene thiourea (part by mass) | 0.6 | 0.6 | 0 | 0.05 | 5 | 0.6 | 0.6 |
| | Dipentamethylenethiuram tetrasulfide (part by mass) | 2 | 2 | 2 | 2 | 2 | 0.05 | 6 |
| Vulcanizing agent | MgO (part by mass) | 2.4 | 2.4 | 2.4 | 2.4 | 2.4 | 2.4 | 2.4 |
| | ZnO (part by mass) | 5 | 5 | 5 | 5 | 5 | 5 | 5 |
| | Sulfur (part by mass) | 1 | 1 | 1 | 1 | 1 | 1 | 1 |
| Process aid | Stearic acid (part by mass) | 0.5 | 0.5 | 0.5 | 0.5 | 0.5 | 0.5 | 0.5 |
| Antioxidant agent | N-phenyl-1-naphthylamine (part by mass) | 2 | 2 | 2 | 2 | 2 | 2 | 2 |
| | 4,4'-Bis(α,α-dimethylbenzyl)diphenylamine (part by mass) | 5 | 5 | 5 | 5 | 5 | 5 | 5 |

Next, each chloroprene rubber composition of Examples and Comparative Examples was evaluated by the methods in the conditions described below.

(Hardness)

A test piece was prepared in accordance with JIS K 6250 (vulcanization condition: 160° C. for 10 minutes), and the hardness of each vulcanizate (vulcanized rubber) was determined in accordance with JIS K 6253.

(Processing Characteristics)

The scorch time of each chloroprene rubber composition of Examples and Comparative Examples was determined at 125° C. in accordance with JIS-K 6300. In the evalution, a composition having a scorch time of 7 minutes or more was evaluated as good processing characteristics.

Each chloroprene rubber composition of Examples and Comparative Examples was vulcanized at 160° C. for 15 minutes, and the vulcanizate was subjected to the test in accordance with JIS K 6262 in a temperature condition of −10° C. for 70 hours, thereby determining the permanent compression set.

(Gehman T10)

Each polychloroprene rubber composition of Examples and Comparative Examples was vulcanized at 160° C. for 10 minutes, and the vulcanizate was subjected to Gehman torsion test in accordance with JIS K 6261. Then, a temperature (T10) at which a sample had ten times the 180-degree torsion modulus at an ambient temperature was determined and the low temperature characteristics of each polychloroprene rubber composition were evaluated from the obtained value.

Table 3 collectively shows the results above.

diene was not added were subjected to morphology observation. Specifically, from a test piece composed of each polychloroprene rubber composition prepared in accordance with JIS K 6250 (vulcanization condition: 160° C. for 10

TABLE 3

| | | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Composition | SBS (part by mass) | 0.1 | 5 | 10 | 5 | 0.01 | 20 | 5 | 5 | 5 | 5 | 5 |
| | Ethylene thiourea (part by mass) | 0.6 | 0.6 | 0.6 | 0.6 | 0.6 | 0.6 | 0 | 0.05 | 5 | 0.6 | 0.6 |
| | Dipentamethylenethiuram tetrasulfide (part by mass) | 2 | 2 | 2 | 2 | 2 | 2 | 2 | 2 | 2 | 0.05 | 6 |
| | Sulfur (part by mass) | 1 | 1 | 1 | 0 | 1 | 1 | 1 | 1 | 1 | 1 | 1 |
| Evaluation | Hardness | 40 | 43 | 46 | 43 | 40 | 52 | 43 | 42 | 44 | 43 | 43 |
| | Scorch time (min) | 7.3 | 7.4 | 7.5 | 9.4 | 4.7 | 7.8 | 12.1 | 11.7 | 3.1 | 9.1 | 4.2 |
| | Tensile strength (MPa) | 24 | 22.8 | 22.4 | 21.1 | 24.4 | 20.2 | 17.7 | 18.1 | 24.1 | 20.4 | 22.9 |
| | Elongation (%) | 736 | 722 | 715 | 700 | 740 | 682 | 599 | 612 | 678 | 645 | 633 |
| | Permanent compression set (%) | 32.2 | 31.8 | 32.1 | 26.5 | 32.1 | 36.8 | 41.1 | 40.2 | 34.5 | 32.2 | 32.9 |
| | Low temperature permanent compression set (%) | 8.5 | 12.5 | 17.5 | 12.9 | 8.5 | 25.9 | 23.9 | 22.8 | 13.4 | 24.4 | 19.9 |
| | Gehman T10 (° C.) | −38.6 | −37.5 | −37.5 | −37.7 | −36.3 | −37.8 | −37.5 | −37.5 | −37.2 | −37.5 | −37.3 |

As shown in Table 2, Comparative Example 1, which included the copolymer of styrene and butadiene in an amount of less than 0.1 part by mass, was inferior in the low temperature characteristics. Comparative Example 2, which included the copolymer of styrene and butadiene in an amount of more than 10 parts by mass, was inferior in the mechanical strength and the permanent compression set.

Both Comparative Example 3, which included no ethylene thiourea and included dipentamethylenethiuram tetrasulfide alone, and Comparative Example 4, which included ethylene thiourea in an amount of less than 0.1 part by mass, were inferior in the permanent compression set and the mechanical strength. Comparative Example 5, which included ethylene thiourea in an amount of more than 3.0 parts by mass, had remarkably reduced processing characteristics and poor mechanical strength, for example, insufficient elongation.

Comparative Example 6, which included dipentamethylenethiuram tetrasulfide in an amount of less than 0.1 part by mass, was inferior in the permanent compression set at low temperature and the mechanical strength. Comparative Example 7, which included dipentamethylenethiuram tetrasulfide in an amount of more than 3.0 parts by mass, could fail to provide sufficient processing characteristics and was inferior in the permanent compression set and the mechanical strength.

In contrast to Comparative Examples, Examples 1 to 4, which included the copolymer of styrene and butadiene in an amount of 0.1 to 10 parts by mass, ethylene thiourea in an amount of 0.1 to 3.0 parts by mass, and dipentamethylenethiuram tetrasulfide in an amount of 0.1 to 3.0 parts by mass, with respect to 100 parts by mass of the rubber components, obtained excellent permanent compression set and mechanical strength while having enough processing characteristics and also achieved the effect of improving low temperature characteristics due to the combination use of the natural rubber.

Furthermore, the chloroprene rubber composition of Example 2 and a chloroprene composition of Comparative Example 8 that was prepared in a similar manner to that in Example 2 except that the copolymer of styrene and butaminutes), a sample for observation was cut out and was observed under a scanning probe microscope (SPM).

FIG. 1(a) is the SPM observation result of the chloroprene rubber composition of Example 2 and FIG. 1(b) is the SPM observation result of the chloroprene rubber composition of Comparative Example 8. As shown in FIG. 1, in the chloroprene rubber composition with the copolymer of styrene and butadiene of Example 2, the natural rubber was more finely homogeneously dispersed in the chloroprene rubber than that in the chloroprene rubber composition of Comparative Example 8.

From the results, it was ascertained that the present invention can provide a vulcanized molding having good permanent compression set within a wide region from a low temperature to a high temperature and excellent mechanical strength.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber composition comprising:
   a chloroprene rubber and a natural rubber in a total amount of 100 parts by mass;
   a block copolymer of styrene and butadiene in an amount of 0.1 to 10 parts by mass;
   ethylene thiourea in an amount of 0.1 to 3.0 parts by mass; and
   dipentamethylenethiuram tetrasulfide in an amount of 0.1 to 3.0 parts by mass,
   wherein the blending ratio of the chloroprene rubber and the natural rubber (chloroprene rubber/natural rubber) is 60/40 to 95/5 by mass ratio.

2. The chloroprene rubber composition according to claim 1, wherein the chloroprene rubber includes a 2,3-dichiorobutadiene unit in an amount of 5 to 20% by mass.

3. A vulcanizate obtained by vulcanization of the chloroprene rubber composition according to claim 1.

4. A molding obtained by vulcanization of the chloroprene rubber composition according to claim 1 after or during molding of the composition.

5. The molding according to claim 4, wherein the molding is a wiper blade or a vibration isolator.

6. The chloroprene rubber composition according to claim 1, wherein the block copolymer of styrene and butadiene includes styrene and butadiene in a mass ratio (styrene/butadiene) of 25/75 to 45/55.

7. A vulcanizate obtained by vulcanization of the chloroprene rubber composition according to claim 6.

8. A molding obtained by vulcanization of the chloroprene rubber composition according to claim 6 after or during molding of the composition.

9. The molding according to claim 8, wherein the molding is a wiper blade or a vibration isolator.

10. The chloroprene rubber composition according to claim 1, wherein the blending ratio of the chloroprene rubber and the natural rubber (chloroprene rubber/natural rubber) is 60/40 by mass ratio.

11. The chloroprene rubber composition according to claim 1, wherein the blending ratio of the chloroprene rubber and the natural rubber (chloroprene rubber/natural rubber) is 95/5 by mass ratio.

\* \* \* \* \*